A. G. AND F. SPENCER AND C. W. C. HINE.
BUFFER, DRAW, AND OTHER SPRING.
APPLICATION FILED APR. 15, 1919.
1,366,507.
Patented Jan. 25, 1921.
2 SHEETS—SHEET 1.
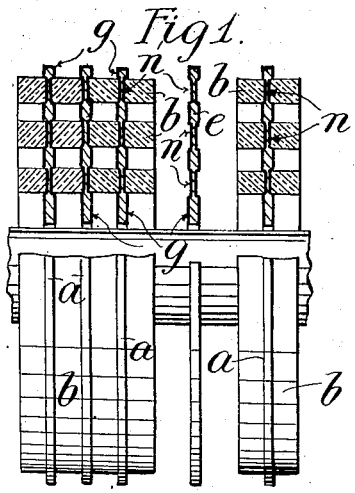
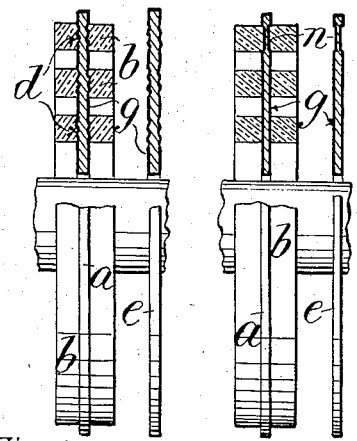
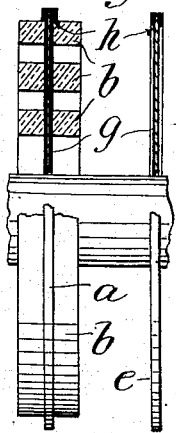
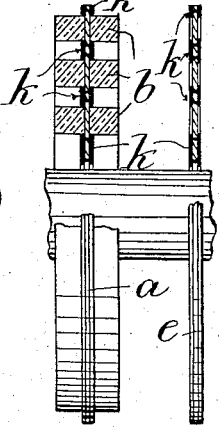
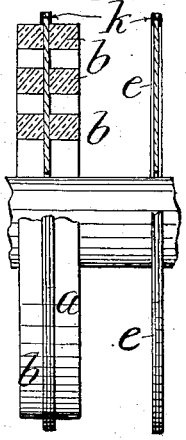

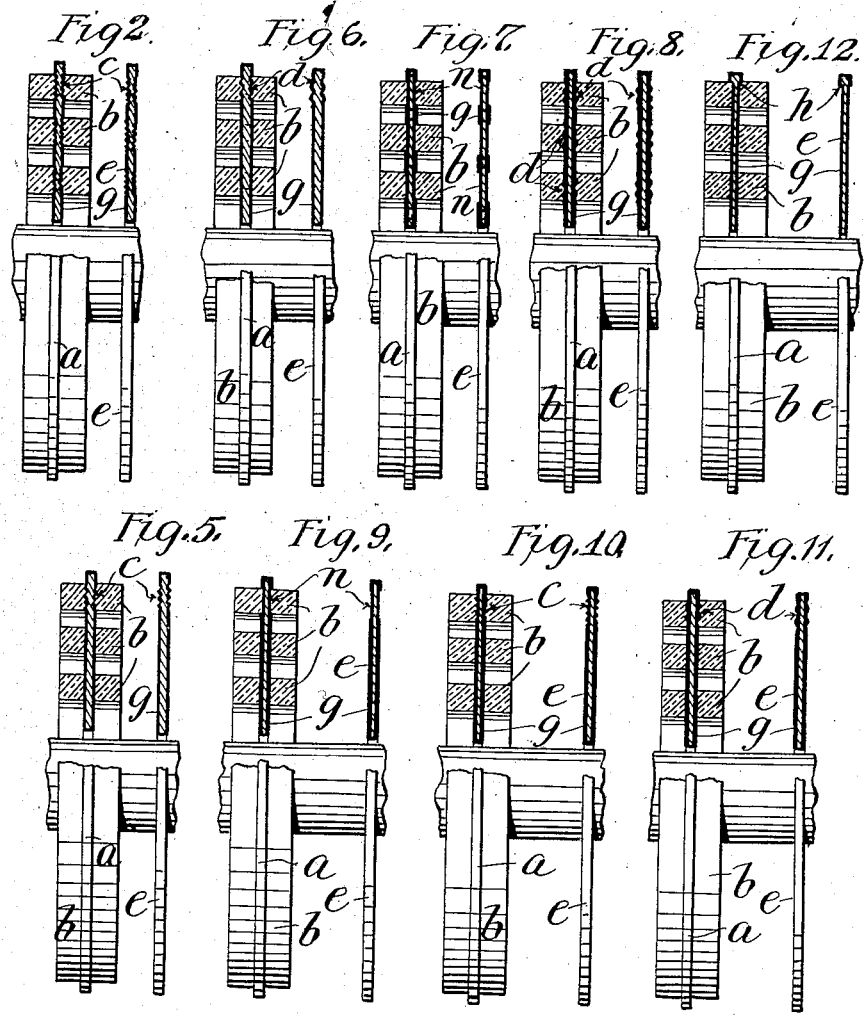

UNITED STATES PATENT OFFICE.

ALFRED GEORGE SPENCER, FRANK SPENCER, AND CHARLES WILLIAM CRESWELL HINE, OF LONDON, ENGLAND.

BUFFER, DRAW, AND OTHER SPRING.

1,366,507.  Specification of Letters Patent.  Patented Jan. 25, 1921.

Application filed April 15, 1919. Serial No. 290,320.

*To all whom it may concern:*

Be it known that we, ALFRED GEORGE SPENCER, FRANK SPENCER, and CHARLES WILLIAM CRESSWELL HINE, subjects of the King of Great Britain and Ireland, residing, respectively, at London, England, have invented Improvements in Buffer, Draw, and other Springs, of which the following is a specification.

This invention relates to buffer and other springs of the type comprising india rubber rings associated with metal plates, commonly used in connection with railway and the like vehicles. Each spring or spring element of such a spring consists for example of two or more india rubber rings arranged concentrically one within the other and having molded into them a perforated or plain metal plate that connects the india rubber rings together and maintains them at a suitable distance apart. Usually a number of such springs or spring elements are assembled in column form to produce a compound spring adapted to give the effect desired, the springs or spring elements being mounted on a buffer or draw rod and the adjacent springs or spring elements being separated by interposed metal plates or rings against which the india rubber rings abut.

It is found that those surfaces of the india rubber rings that are in contact with the metal plates become worn or abraded by reason of the movement of the india rubber relatively to the metal plates as the india rubber rings alter their shape during compression and expansion after compression. In springs according to the present invention this movement of the end surfaces of the india rubber rings relatively to the plates is prevented and the lives of the springs consequently lengthened.

The relative positions of the concentric india rubber rings on the metal plates in springs of the kind in question are such that, when fully compressed the inner india rubber rings bear with their inner peripheries against the buffer or draw rod on which the spring is mounted and the outer and inner peripheral faces of the concentric india rubber rings of the set bear one against the other excepting of course the said inner peripheral surfaces of the inner india rubber rings and the outer peripheries of the outer india rubber rings. The result is that the inner and intermediate rings mutually support each other whereas there is a tendency when the spring is compressed to force the outer india rubber rings outwardly from their proper positions on the metal plates to which they are connected or against which they bear and according to the present invention the sliding movement of the end faces of the said outer india rubber rings relatively to the metal plates is positively prevented as hereinafter described.

It is found that the life of a spring is greatly increased if moisture is prevented from entering the annular spaces inclosed by the india rubber rings. Normally the compound spring constituted by the column of springs or spring elements with metal dividing plates as set forth above is under such initial stress that moisture cannot freely pass within the outer india rubber rings of the sets of concentric rubber rings but moisture tends to creep from the marginal portions of the plates past the outer india rubber rings toward the center; this is prevented however in the improved spring by the means that prevent outward movement of the outer rings relatively to the plate.

Figure 1 of the accompanying drawings shows in sectional elevation an arrangement of three spring elements and dividing plates embodying the invention.

Fig. 2 is a similar view to Fig. 1 illustrating a modification, one spring element and dividing plate only being shown.

Figs. 3 to 15 are similar views to Fig. 2 each illustrating a single spring element and corresponding dividing plate embodying further modifications.

In the spring shown in Fig. 1, the metal plates *a* are recessed at *n* to say one 32nd of an inch or so to receive the end faces of the india rubber rings *b*, and are each faced all over with vulcanite or other hard rubber *g* that covers the whole face including the recesses. Similarly the dividing plates *e* are recessed to receive the india rubber rings *b* and faced with vulcanite or other hard rubber that covers the whole face including the recesses. The end faces of the india rubber rings are prevented from sliding relatively to the plates by the recesses.

The spring shown in Fig. 2 is similar to that shown in Fig. 1 except that instead of the vulcanite faced plates being recessed to prevent sliding movement of the india rubber rings they are roughened by having spiral screw threads c cut in them at those parts thereof in contact with the india rubber rings b.

Fig. 3 shows a spring that is in all respects similar to that shown in Fig. 2, except that the roughening is effected by forming concentric grooves or corrugations d on those parts of the vulcanite covered metal plates in contact with the india rubber rings.

In the spring shown in Fig. 4, the metal plates are only grooved at n to receive the outer india rubber ring, in other respects the spring is similar to that shown in Fig. 1, the metal plates being faced all over with vulcanite g.

As shown in Figs. 5 and 6 the roughening c of the metal plates may be limited to those parts thereof in contact with the outer india rubber rings only. In other respects the springs shown in these figures are similar to those shown in Figs. 2 and 3 respectively, the metal plates being entirely faced with vulcanite g.

Fig. 7 shows a spring in which the metal plates are plain and recesses n to receive all the india rubber rings, as in the spring shown in Fig. 1, are formed in the vulcanite facing g of the metal plates. The vulcanite at opposite sides of each plate may be connected by fillings of india rubber located in holes formed through the plates.

The spring shown in Fig. 8 also embodies metal plates that are not recessed or roughened, but are faced all over with vulcanite g which where in contact with the india rubber rings is roughened in a similar manner to the metal plates of the spring shown in Fig. 3.

Figs. 9, 10 and 11 illustrate springs in which the outer india rubber ring only is received in a recess or on a roughened or corrugated surface, such recess being plain in Fig. 9, formed with a spiral V shaped thread in Fig. 10 and with concentric corrugations in Fig. 11 and produced, not in or on the metal plates but in or on the vulcanite g with which such plates are faced.

Fig. 12 shows a spring embodying metal plates each formed with a marginal shoulder h to restrain outward movement of the outer india rubber ring, the whole plate being faced with vulcanite g.

In the spring shown in Fig. 13 the outer india rubber ring is also restrained from outward movement by a marginal shoulder h but in this case the plate is plain and the marginal shoulder is formed in the vulcanite g with which the plate is entirely faced.

In the spring shown in Fig. 14 recesses to receive all the india rubber rings b are formed by vulcanite rings k molded on to plain metal plates a and e which as shown may each be perforated to receive rubber fillings that connect the vulcanite rings at opposite sides of the plate.

In the spring shown in Fig. 15 plain metal plates a and e are provided with marginal shoulders to restrain outward movement of the outer india rubber ring, the said shoulders being formed by vulcanite rings k molded on to the metal plates and connected by vulcanite fillings.

In some cases the dividing plates e may be plain and the metal plates a only be provided with vulcanite rings k or in other cases the plates a may be plain and the dividing plates e only be provided with vulcanite rings.

The vulcanite facing increases the life of the spring by preventing corrosion of the metal and minimizing abrasion or wear of the india rubber rings the sides of which, during compression, roll on the metal plates.

As will be understood the invention is not limited to a spring with three concentric india rubber rings as there may be but two india rubber rings in some cases and in others four or more india rubber rings may be provided.

What we claim is:—

1. A spring comprising metal plates and vulcanite facings therefor together forming bearing members with slightly projecting margins in the vulcanite facings and concentrically arranged india rubber rings combined with the vulcanite faced plates, the outer rings circumferentially engaging the margins aforesaid whereby sliding movement in an outward direction of the end faces of the outer india rubber rings relatively to the vulcanite faced plates is positively prevented.

2. A spring comprising metal plates and vulcanite facings therefor together forming bearing members with shallow recesses in the vulcanite facings and concentrically arranged india rubber rings combined with the vulcanite faced plates the end faces of the outer rings being seated in the shallow recesses in the vulcanite facings so that sliding movement of the said end faces relatively to the said plates is prevented.

3. A spring comprising metal plates and vulcanite facings therefor together forming bearing members with shallow recesses in the vulcanite facings and concentrically arranged india rubber rings combined with the vulcanite faced plates, the end faces of all the rings being seated in the shallow recesses in the vulcanite facings so that sliding movement of the said end faces relatively to the said plates is prevented.

4. A spring comprising metal plates and vulcanite facings entirely covering the same, the plates and facings together forming bearing members with shallow recesses in the vulcanite facings, and concentrically arranged india rubber rings combined with the vulcanite faced plates, the end faces of the outer india rubber rings being seated in the shallow recesses in the vulcanite facings so that sliding movement of the said end faces relatively to the said plates is prevented.

5. A spring comprising metal plates and vulcanite facings entirely covering the same, the plates and facings together forming bearing members with shallow recesses in the vulcanite facings, and concentrically arranged india rubber rings combined with the vulcanite faced plates, the end faces of all the rings being seated in the shallow recesses in the vulcanite facings so that sliding movement of the said end faces relatively to the said plates is prevented.

6. A spring comprising a number of spring elements arranged in column form, each consisting of a metal plate and a vulcanite facing therefor, a plurality of india rubber rings concentrically arranged in fixed relationship upon the metal plate and metal plates also having vulcanite facings separating the several spring elements aforesaid.

Signed at London, England, this 26th day of March, 1919.

ALFRED GEORGE SPENCER.
FRANK SPENCER.
CHARLES WILLIAM CRESSWELL HINE.